United States Patent [19]

Cote et al.

[11] Patent Number: 5,607,593
[45] Date of Patent: Mar. 4, 1997

[54] INSTALLATION FOR MAKING WATER POTABLE WITH SUBMERGED FILTERING MEMBRANES

[75] Inventors: Pierre Cote, Maisons-Laffitte; Michel Faivre, Acheres; Catherine Moulin, Paris; Gilbert Desbos, Maisons-Laffitte, all of France

[73] Assignee: OTV Omnium De Trajtements et de Valorisation S.A., Courbevoie, France

[21] Appl. No.: 346,858

[22] Filed: Nov. 30, 1994

[30] Foreign Application Priority Data

Nov. 30, 1993 [FR] France ................................ 93 14570

[51] Int. Cl.$^6$ ................................................ B01D 61/00
[52] U.S. Cl. .................... 210/650; 210/636; 210/651; 210/652; 210/323.2; 210/257.2; 210/258; 210/760; 210/758; 210/220; 210/333.01; 210/333.1; 210/195.2; 210/321.69
[58] Field of Search ........................ 210/195.2, 257.2, 210/256, 258, 758, 760, 765, 704, 323.2, 330, 332, 220, 663, 333.01, 333.1, 652, 660, 321.69, 791; 261/76, 94, 21, DIG. 42

[56] References Cited

U.S. PATENT DOCUMENTS

| | | | |
|---|---|---|---|
| 3,617,033 | 11/1971 | Ichikawa et al. | 261/21 |
| 4,071,445 | 1/1978 | Katayama et al. | 210/259 |
| 4,405,466 | 9/1983 | Giannelli et al. | 210/333.01 |
| 4,414,113 | 11/1983 | La Terra | 210/333.01 |
| 4,540,490 | 9/1985 | Shibata et al. | 210/333.01 |
| 5,192,456 | 3/1993 | Ishida et al. | 210/791 |
| 5,271,830 | 12/1993 | Faivre et al. | 210/151 |
| 5,314,076 | 5/1994 | La Place et al. | 210/205 |

FOREIGN PATENT DOCUMENTS

| | | |
|---|---|---|
| 0433200 | 6/1991 | European Pat. Off. . |
| 0561458 | 9/1993 | European Pat. Off. . |
| 2306942 | 11/1976 | France . |
| 2655642 | 6/1991 | France . |
| 0021850 | 2/1978 | Japan ................ 210/760 |
| 62-197198 | 8/1987 | Japan . |
| 62-221493 | 9/1987 | Japan . |
| 01037277 | 2/1989 | Japan . |
| WO90/05011 | 5/1990 | WIPO ................ 210/760 |

OTHER PUBLICATIONS

Preliminary Search Report for French priority application No. 9314570, dated 10 Aug. 1994 from the French Patent Office, citing the above-noted references.

*Primary Examiner*—Ana Fortuna
*Attorney, Agent, or Firm*—Merchant, Gould, Smith, Edell, Welter & Schmidt

[57] ABSTRACT

A water-treatment installation, notably with a view to making water potable, includes a reactor demarcating at least one treatment chamber, the reactor comprising a conveying assembly to convey the water to be treated into the chamber; a removing assembly for removing the floated pollutants and a removing assembly for removing the decanted pollutants; a plurality of filtration membranes laid out within the chamber and submerged in the water to be treated; a demarcating assembly for demarcating a filtration zone around each of the membranes; carrying and circulating member guiding a current of water to be treated in the filtration zone along a preferred direction, the carrying and circulating member including ozone-injection assembly; and a recovering assembly recovering the permeate at an outlet of the filtration membranes.

34 Claims, 10 Drawing Sheets

Flotation section

Decantation section

INSTALLATION FOR MAKING WATER POTABLE WITH SUBMERGED FILTERING MEMBRANES

BACKGROUND OF THE INVENTION

1. Field of the Invention

The field of the invention is that of filtration and purification installations for the treatment of water.

The invention can be applied more particularly but not exclusively to giving the quality of potability to water such as for example deep or karstic underground water or surface water.

2. Description of the Prior Art

Conventionally, installations for treating water with a view to making it potable generally comprise a succession of physical/chemical treatment units of the flocculation/decantation/filtration type, complemented by an oxidation unit.

Flocculation constitutes a physical/chemical step designed to modify the state of the colloidal particles contained in the water by the addition thereto of a coagulant. (aluminium chloride polymer, alumina sulfate, ferric chloride, etc.) in order to enable their elimination by decantation.

The microorganisms, micropollutants, compounds (ferrous iron, manganese, etc.) that cannot be eliminated by flocculation are, for their part, destroyed by the use of powerful oxidants such as ozone, chlorine or again chloride dioxide.

The elimination of the micropollutants can also be done by stripping (forced air circulation) if they are volatile or by adsorption on activated carbon. The latter methods have the drawback however of not destroying the pollution unlike the oxidants. This is why ozone is frequently used, alone or in combination with hydrogen peroxide or ultraviolet radiation, to make consumption water potable.

A standard installation for the treatment of water with a view to making it potable could thus be constituted by a flocculation unit followed by a decantation unit, a filtration unit (for example on sand), an ozonization unit, a filtration unit on granular or powdered activated carbon and finally a disinfection unit.

The filtration units conventionally used in such potable-water installations may advantageously have two layers of filtering materials and notably a first layer of granular carbon placed above a second layer of sand. The use of such superimposed layers of filtering materials makes it possible to obtain an efficient retention of the particles contained in the water to be treated provided that the beds of granular materials are regularly washed.

This washing of the granular beds is conventionally done by backwashing by making provision, in the filtration unit, for double bottom demarcated by a wall provided with strainers enabling the a washing liquid (for example the filtrate) to be sent into the granular materials forming the beds in order to rid them of the particles that are retained therein.

As an alternative to the standard types of treatment for making water potable, there has recently been proposed a method of filtration on membrane(s). Thus, there is a known water-treatment installation described in the French patent FR 2 655 642 comprising a loop for the circulation of the water to be treated including at least one tangential filtration membrane with the injection of ozone into the circulation loop.

The prior art installations used to make water potable have many drawbacks.

First of all, since they are formed by a plurality of units, each dedicated to a specific treatment, they have large dimensions which may prove to be troublesome or their lay out. This problem is particularly heightened when potable-water installations are being set up in urban environments, namely places where the surface area is scarce and therefore often costly.

Furthermore, such installations require the setting up of many connections between the different treatment units. The installation of these connections is often lengthy, costly and the connections constitute all so many weak points in the installation.

It will also be noted that the use of chemical reagents during the flocculation step leads to the formation of substantial quantities of sludge and to the need to treat the sludge formed by the coagulation of the organic matter contained in the treated water.

SUMMARY OF THE INVENTION

The aim of the present invention is to resolve the different problems, notably by proposing an installation for the treatment of water with a view to making it potable, said installation having dimensions that are substantially smaller than those of the installations known in the prior art.

In particular, one of the aims of the invention is to propose an installation that integrates, into one and the same casing, at least some of the following treatment operations: flotation, decantation, filtering, oxidation.

Yet another aim of the invention is to describe an installation that can be integrated into existing casings.

Yet another aim of the invention is to provide a number of connections that is smaller than the number of connections conventionally needed in prior art potable-water installations.

Another aim of the invention is also to include, in a water-treatment installation, one or more filtration membranes replacing the filtration units using granular bed(s) while at the same time enabling high flow-rates of treatment to be maintained.

Another aim of the present invention is also to propose a treatment installation for making water potable having high flexibility of use, notably during the implementation of the step for the backwashing of the membrane or membranes.

Finally, another aim of the invention is to propose a water-treatment installation that can implement many variants of filtration or backwashing methods and can be set up according to numerous constructional variants.

These different aims as well as others that shall appear herein after are achieved by means of the invention which relates to a water-treatment installation, notably with a view to making water potable, wherein said installation includes:

- a reactor demarcating at least one treatment chamber comprising means to convey the water to be treated into said chamber, means for the removal of the floated pollutants and means for the removal of the decanted pollutants;
- a plurality of filtration membranes provided within said chamber and designed to be submerged in the water to be treated;
- means to demarcate a filtration zone around each of said membranes;

carrying and circulation means enabling the guiding of the current of water to be treated in said filtration zone along a preferred direction, said carrying and circulation means including ozone-injection means;

means to recover the permeate at the outlet of said filtration membranes.

According to the invention, there is thus created a fluid-lift enabling the carrying of the water to be treated in the preferred direction of filtration.

The ozone could thus be produced out of air or oxygen. Ozone indeed has the advantage of being a powerful oxidant of organic material permitting radical reactions that involve, inter alia, the radical OH. As shall be explained in greater detail further below, it could be worthwhile, in certain cases, to use the installation according to the invention so as to extend the time of contact between the water to be treated and the ozone.

The ozone used within the installation can also be used to fulfil several complementary roles:

bactericidal or virulicidal action on the water to be treated and hence the aseptization of this water, the improvement of its organoleptic qualities (taste, color and odor), the oxidation of the micropollutants, the oxidation of the dissolved metals such as iron and manganese.

When ozone is thus used to serve both as a circulation fluid and as an oxidizing fluid, the installation according to the invention enables the integration, into one and the same reactor, of the functions of flotation, decantation, filtration and oxidation which hither to devolved on distinct treatment units.

Advantageously, said preferred direction is a flow of the current of water tangential to said membranes.

The use of means enabling a preferred direction of filtration leads to the obtaining of a reactor in which the following are produced:

the filtration of the water on membranes, the flotation of the particles less dense than water that are retained by the membranes and, the decantation of the particles more dense than the water that are retained by the membranes.

The installation according to the invention therefore has a concept that enables the elimination of the flocculation and decantation pre-treatment units usually designed upstream with respect to the filtration units when these filtration units are conventionally formed by filters with granular bed(s)by integrating the functions fulfilled by the different units in one and the same reactor.

It will be understood that an integration such as this has numerous advantages among the following may be cited:

the elimination of a large number of connections hitherto used to connect the units to one another;

the gain in space brought about by the making of a reactor in which the pre-treatment operation takes place. Although it is possible to envisage the making of means to demarcate the filtration zones in other forms, these means are preferably constituted by sheaths each surrounding one membrane, said sheaths having holes that enable the passage of the water to be treated in said preferred direction of treatment. Sheaths such as this enable the precise demarcation of the filtration zone around each membrane, the holes for their part making it possible to set up a precise circuit of the route taken by the water so that the water can undergo very effective filtration at said membranes.

Preferably, said membranes and said means for the demarcation of a filtration zone around each of said membranes have a vertical position within said treatment chamber. In certain embodiments, it is possible however to envisage the placing of the membranes and the sheaths that surround them in a horizontal or inclined position. However, the vertical positioning is preferred in a inasmuch as it fosters the flow of the water to be treated.

Also preferably, the reactors are provided with a wall to which said membranes are fixedly joined, said wall forming a double chamber constituted by a first chamber formed by said treatment chamber and by a second chamber forming a zone to recover the permeate.

Advantageously, this wall forms a double bottom for said reactor. It will be noted however that a wall such as this could, as the case may be and in other embodiments, form not a double bottom but a wall demarcating a lateral chamber for the recovery of the permeate.

According to an alternative embodiment of the invention, said ozone-injection means may be constituted by means for the formation of ozone bubbles. Thus, in addition to the chemical action of the ozone, there is the mechanical action of the bubbles which are advantageously used to unclog the membranes.

According to another variant, said ozone-injection means include means to dissolve ozone in water.

As shall be explained in greater detail here below, the latter means could notably be constituted by a hydro-injector installed downstream with respect to a pump for the recirculation of the water to be treated in the installation or by a device for the pressurized dissolving of ozone in water, also set up down stream with respect to a recirculation pump.

The ozone could therefore be introduced into the installation according to the following three modes of implementation:

in a gaseous monophase form: through the use of means for the formation of ozone bubbles distributed in the vicinity of the membranes;

in a biphase form: through the use of ozone-dissolving means in a part of the water to be treated and recirculated;

in an aqueous monophase form through the use of means for the pressurized dissolving of ozone in a part of the water to be treated and recirculated.

Preferably, the installation has means for the recovery of residual ozone. This ozone could advantageously be reinjected into the installation or again it could be destroyed.

As for the membranes used in the installation according to the invention, they could be plane membranes or again organic or mineral tubular membranes. However, in a preferred embodiment, said membranes are each formed by a set formed by a plurality of hollow fibers used in external/internal filtration mode. These ozone-resistant organic membranes are advantageously chosen from the group of fluorine-containing polymers such as PVDF or PTFE.

Membranes such as these have the advantage of providing a greater filtering surface area for a given volume of occupation than the surface areas-of the previously-mentioned membranes.

Finally, in addition to their compact nature, they cost little which makes them very promising in the context of the making of an installation according to the invention.

Preferably, said hollow fibers are plugged at one of their ends, the other end communicating with said means for the recovery of the permeate.

Also preferably, said ozone-injection means include at least one tube going through said membranes along their longitudinal axis, in parallel to said hollow fibers, said tubes enabling the ozone to be conveyed from a supply network provided above said membranes up to the base of said membranes.

According to another variant of the invention, said ozone-injection means include porous structures preferably set up at the base of said membranes. In such an embodiment, the ozone is therefore provided directly to the base of the membranes and no longer conveyed by tubes from the top of these membranes to their base. A construction such as this has the advance of using standard porous structures and furthermore has the advantage of getting rid of any ozone distribution circuits at the upper end of the filtering units and hence of simplifying the making of these units.

According to one variant of the invention, said sheaths demarcating the filtration zones have lower holes into which the water penetrates and upper holes by which the water and the carrying fluid escape, the water having a rising motion tangential to said membranes. It will be noted however that it is possible to envisage the providing of the sheaths with holes located at other places without departing from the framework of the invention.

According to one variant of the invention, said means for the recovery of the permeate have at least one suction pump. Such a pump may be used to place the permeate-recovery zone in a state of depression with respect to the treatment chamber and thus bring about the passage of water through the filtration membranes. However, the installation could also be provided by means for pressurizing the treatment chamber, forcing the water through the filters so as to discharge it into the permeate-recovery zone, this zone being then kept under atmospheric pressure. It will be noted that the permeate could also be removed by gravity, notably by means of a siphon.

Preferably, said wall between the treatment chamber and the permeate-recovery chamber is provided with means for the injection, into said membranes, of a fluid for the washing of the membranes. Such means may be constituted, for example, by tubes going through said wall and leading into the permeate zone of the membranes. Such tubes are used to send the washing liquid into the treatment chamber in order to rid the membranes of the particles that are fixed thereto, this washing fluid possibly being water and notably the permeate or another fluid such as air.

Also preferably, the installation has a backwashing pump enabling the said membranes to be washed in a reverse current by means of the permeate.

According to an alternative embodiment of the invention, the installation also has an air compressor, enabling the injection of pressurized air into said permeate-recovery chamber, that could be used to:
test the integrity of the membranes;
push the permeate into the membranes at the time of the backwashing;
increase the flow of air into the ozone-injection circuit or into a separate circuit to improve the efficiency of the washing and flotation operations;
drive the floating material to the surface of the reactor.

It can be noted that, for the latter two functions, the ozone is injected into the treatment chamber.

To test the integrity of the membranes, compressed air is sent into the membranes. A substantial loss of load or the appearance of bubbles on the surface of the treatment chamber means that there is a break in the structure of the membrane. It is therefore possible to make periodic and simple checks on the condition of the membranes.

During a backwashing operation, the compressed air may also be used to help push the permeate back through the membranes.

Also advantageously, the installation according to the invention has means to recirculate a part of the water present in said treatment chamber coupled with ozone supply means. Recirculation means such as these enable a part of the water to be treated to be ozonized so that it can be used as a guiding fluid.

Advantageously, these recirculation means include at least one recirculation loop.

According to one variant of the invention, the installation may thus comprise at least one hydro-injector provided on said recirculation loop, said hydro-injector enabling the dispersal of the ozone given by the ozone-supply means in the water flowing through said recirculation loop. A hydro-injector such as this enables the injection of the ozone in biphase form into said filtration zones.

According to another variant, the installation may include at least one saturator provided on said recirculation loop, said saturator enabling the dissolving, under high pressure, of the ozone given by the ozone-supply means in the water flowing through said recirculation loop. A saturator such as this enables the injection of the ozone in aqueous monophase form into said filtration zones.

According to one variant, the installation furthermore has units that enable the refining of the water-treatment process, said units being provided at the outlet of said reactor and making it possible notably to eliminate the load of biodegradable, dissolved organic carbon formed by the ozonization of the water to be treated as well as the by-products resulting from this ozonization, such as bromates.

Units such as this are advantageously chosen from the group formed by safety barriers including one or more nanofiltration and/or reverse osmosis membranes.

According to an alternative embodiment of the invention, the installation does not include any sheath demarcating the filtration zones which are then demarcated solely by the force of the fluid for guiding the water to be treated.

The invention also relates to a filtration set for the treatment of water, notably with a view to making it potable, wherein said set comprises:
a treatment chamber comprising means to convey the water to be treated into said chamber, means for the removal of the floated pollutants and means for the removal of the decanted pollutants;
a filtration membrane surrounded by a sheath demarcating a filtration zone, said membrane being setup within said treatment chamber;
a wall to which said membrane is fixed, setting up a double bottom in said treatment chamber and demarcating a zone for the recovery of the permeate;
ozone-injection means enabling the creation of a current of water within said sheath.

The invention also relates to a method for the treatment of water notably with a view to making it potable wherein said method comprises the steps of:
filtering the water through a plurality of membranes submerged in the water to be treated;
preparing a filtration zone around each of these membranes;
carrying along a current of water in the filtration zone in a preferred direction by the use of carrying and circulation means that include ozone-injection means;
recovering the permeate at the outlet from said membranes.

The ozone could be used alone or with another oxidant compound such as, notably, hydrogen peroxide.

According to an advantageous variant of the invention, the method includes a step consisting of the elimination of at least a part of the pollutant matter dissolved in the water to be treated, such as notably pesticides, by the addition to said treatment chamber of at least one reagent that is a coagulant, adsorbent or oxidant. A reagent such as this could notably be formed by powdered activated carbon.

Finally, the invention relates to several uses of the installation described here above. The invention thus relates to a use wherein said treatment chamber is supplied uniformly on the surface with the water to be treated and the chamber for the recovery of the permeate from the membranes is placed in a state of depression. A use such as this permits a reduced consumption of energy.

The invention also relates to a use wherein an internal recycling of the water to be treated is carried out inside said treatment chamber so as to prolong the time during which the water to be treated is in contact with the ozone. Such a use may prove to be necessary notably to increase the rate of elimination of the micropollutants.

The invention also relates to a use comprising the implementation of membrane backwashing operations by the injection, in reverse current, of permeate into the treatment chamber of the installation, the periodicity of the backwashing operations varying as a function of the load of suspended matter in the water arriving in the installation and on the efficiency of the flotation.

The invention also relates to the use consisting of the implementation of the membrane backwashing operations by the injection, in reverse current, of an aqueous monophase mixture of water and ozone.

The invention also relates to a use consisting of the implementation of the membrane backwashing operations by the injection of compressed air into the permeate-recovery chamber to displace the water into the membranes.

Finally, the invention relates to a use consisting of the injection of the compressed air into said permeate-recovery chamber in order to check the integrity of the membranes.

It will be noted, in its preferred embodiment, wherein the carrying fluid is ozone, the invention constitutes, in a way, an improvement of the technique claimed in the French patent FR 2 655 642. This document describes an installation for the filtration and purification of liquids such as water comprising a filtration loop with a recirculation pump and at least one tangential filtration membrane that goes through a part of the liquid to be treated and furthermore comprising means for the addition of ozone to the water to be treated into the loop upstream with respect to the membrane, so as to form micro-bubbles of ozone having a size such that they create turbulence in the liquid perpendicularly to the membrane. This turbulence, coupled with the phenomenon of oxidation, limits the clogging of the membrane and leads to an improvement in the flow rate and the physical/chemical qualities of the permeate. In the preferred embodiment of the present invention, a recirculation loop such as this is formed by the creation of a current of water that gets displaced under the effect of the ozone in a preferred direction furthering the filtration, said current entering by the lower holes of the sheaths that demarcate the filtration zones and leaving by the upper holes.

The invention also relates to a use of the installation described comprising a step that consists of the regeneration of said membranes by washing with ozone. During such a use, the supply of water is stopped. The permeability of the membranes may be restored by the injection of ozone and recirculated water.

Finally, the invention also relates to a use of the installation consisting of the regeneration of said membranes by washing with a cleansing solution containing at least one chemical, said treatment chamber of the installation then being used as a vessel for the mixing and recycling of said cleansing solution. The chemicals used may thus notably be soda, an acid or again a detergent.

BRIEF DESCRIPTION OF THE DRAWINGS

The invention as well as its different advantages shall be understood more easily from the following description of several embodiments, made with reference to the appended drawings of which.

DETAILED DESCRIPTION

Figure 1:
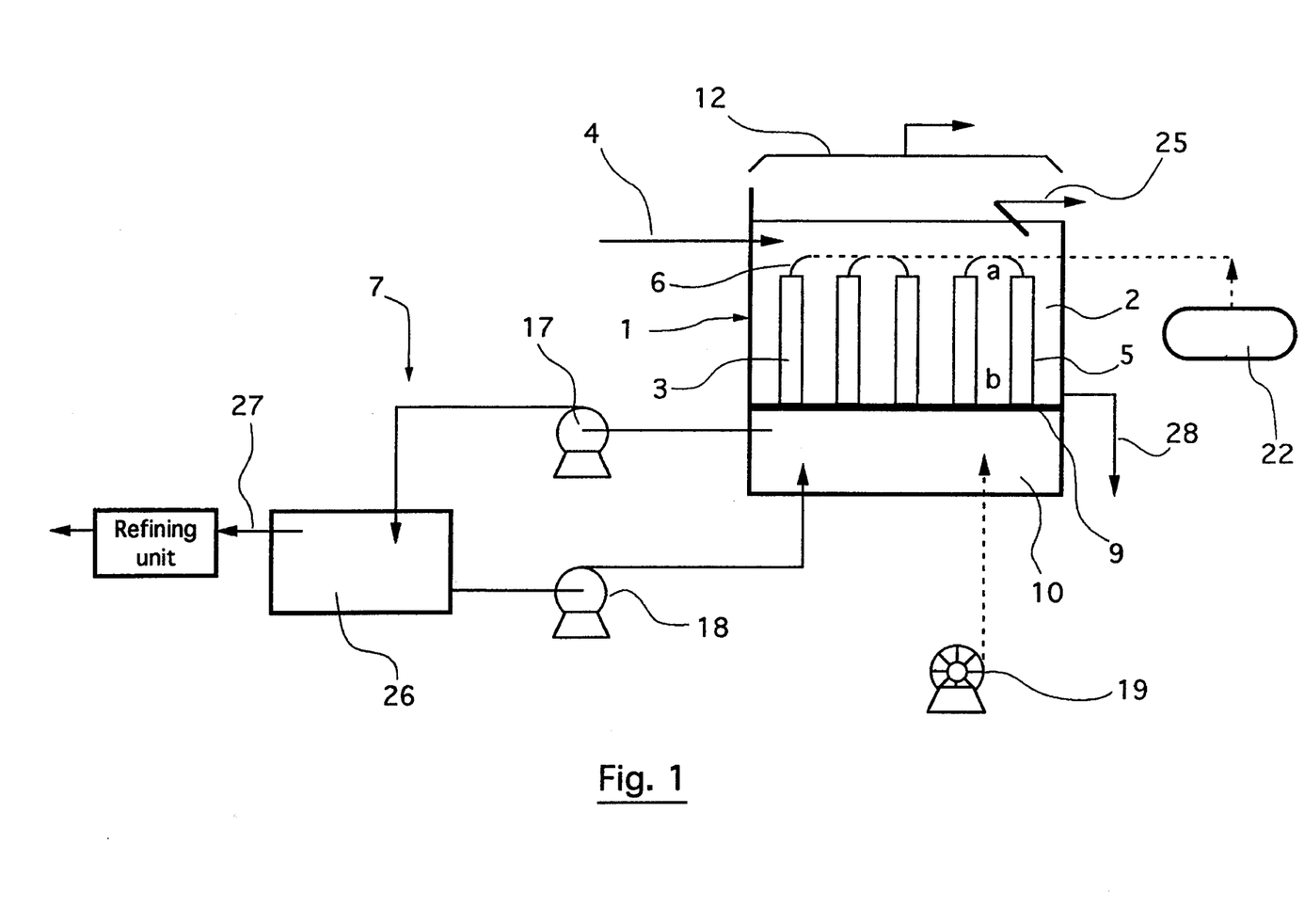
FIG. 1 shows a schematic view of an installation according to the invention working with ozone in a gaseous monophase form.

Referring to FIG. 1, an installation for the treatment of water with a view to making it potable comprises a reactor 1 provided with a wall 9 demarcating a double bottom within the reactor 1 and dividing this reactor 1 into an upper water-treatment chamber 2 and a lower chamber 10. This wall 9 supports a plurality of filtration modules 31 each constituted by several hollow fibers housed in a sheath 5. Each of these modules has a height of 125 cm and a diameter of 12 cm with a filtering surface area of 10 m2. These modules each contain 1600 hollow fibers having an internal diameter of 1.1 mm and an overall diameter of 2 mm.

The permeate zone of these membranes 3, which is formed by the interior of the hollow fibers, communicates with the lower chamber 10 which forms a chamber for the recovery of the permeate.

Figure 5:
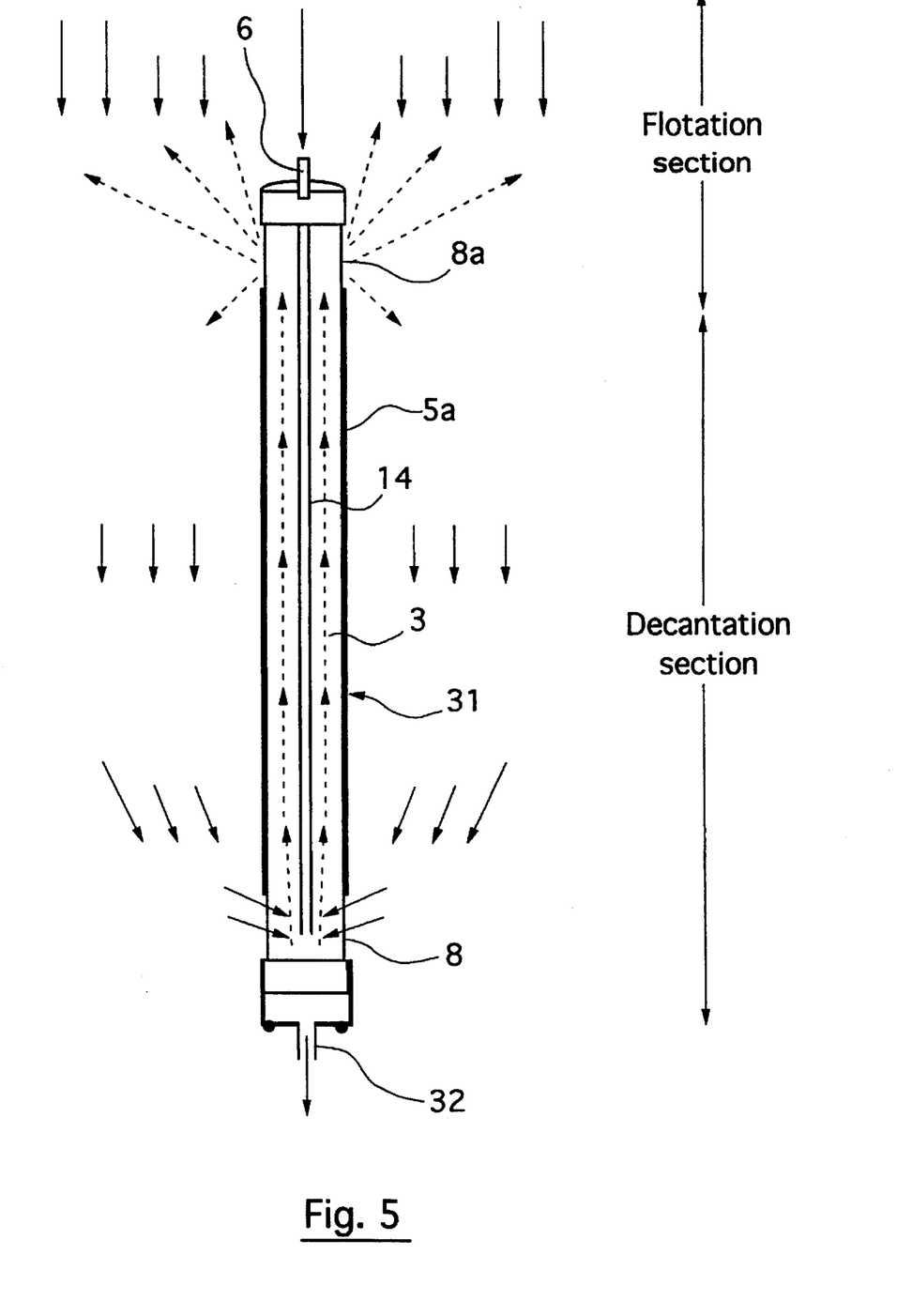
FIG. 5 shows a filtration module used in the context of the embodiment of the installation shown in FIG. 1.
Figures 6, 6A:
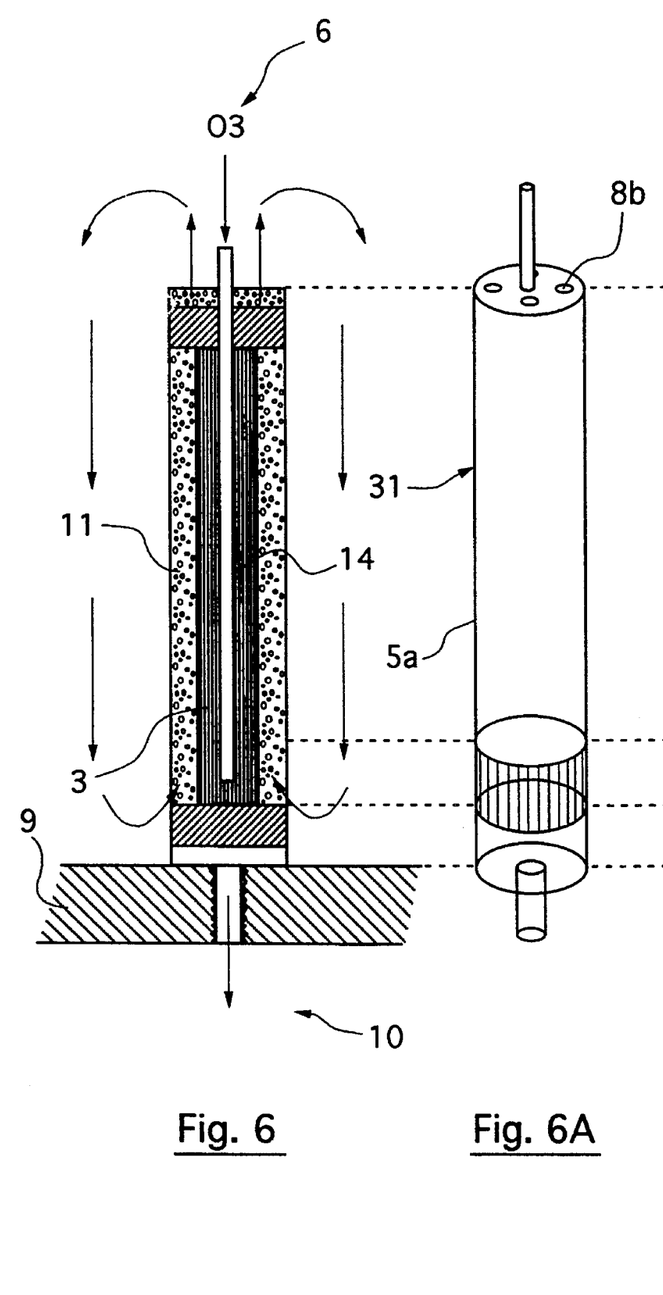
FIGS. 6, 6a, 6b give a more precise view of the filtration module shown in FIG. 5 and one of its variants.

The filtration modules whose design shall be described in greater detail with reference to FIG. 5 and FIG. 6 are connected to ozone-injection means 6 at their upper ends. These ozone-injection means 6 are themselves connected to ozone-supply means 22.

The reactor 1, in its upper part, has means 4 to convey raw water to be treated into the upper part of this reactor as well as means 28 to remove the retained filtration material that is decanted and means 25 to remove the material that is floated.

Furthermore, a hood 12 set up above the reactor 1 enables the recovery and destruction of the residual ozone coming from this reactor.

The wall 9 to which the filtration modules are fixed therefore demarcates a raw water zone 2 in the treatment chamber and a permeate zone in the permeate-recovery chamber 10. This permeate zone communicates with the filtration modules at the lower part of the membranes 3.

The permeate-recovery chamber 10, for its part, communicates with permeate-recovery means 7 including a suction pump 17 enabling the chamber 10 to be placed in a state of depression with respect to the treatment chamber 2 and a permeate storage container 26 provided with an outlet 27. This container 26 furthermore communicates with a backwashing pump 18 enabling the reinjection of the permeate that is stored in the treatment chamber 2. Finally, the chamber 10 is also in a state of communication with a compressor 19.

During the operation of the installation according to the invention, the raw water is led into the treatment chamber 2 of the reactor 1 by the pipe 4 so as to submerge the filtration modules 31 formed by the membranes 3 in their respective sheaths 5. Around each membrane, these sheaths 5 demarcate filtration zones within which the raw water is guided by means of the injection of ozone by the injection means 6.

As shall be explained in greater detail with reference to FIGS. 5 and 6, these ozone-injection means enable the conveying of the ozone bubbles to the base of the membranes 3 and thus enable the creation of a current in a preferred upward filtering direction within the sheaths 5.

Through the appearance of a current such as this, the raw water zone present within the treatment chamber 2 is divided into two sections: a first section (a) in which there occurs the flotation of the particles contained in the raw water that are more dense than this water and that are retained by the membranes and a second section (b) in the lower part of the chamber 2 in which there occurs the decantation of the particles that are more dense than the raw water and that are retained by the filtration membranes.

In order to permit the filtration of raw water within the membranes 3, the permeate-recovery chamber 10 is put under negative pressure by means of the suction pump 17. In practice, this pressure varies from −0.2 to −0.8 bars. It will be noted that the device used as the suction pump 17 could notably be a centrifugal pump making it possible to obtain a substantially constant pressure or again a positive displacement pump making it possible to obtain a constant flow-rate of permeate.

It will also be noted that the only operations to which the supply water brought in by the pipe 4 will be subjected will be a screening operation and a sand-removal operation by way of pre-treatment. Indeed, the integrated flotation and decantation functions enable the removable of the suspended matter that could harm the working of the membranes. This amounts to a major advantage as compared with the modules using standard hollow fibers for which the supply water has to be pre-filtered at a cut-off threshold of 50 to 200 m.

The installation described therefore enables the integration of the processes of filtration on membranes, flotation and decantation of water as well as that of the oxidation of this water in the same reactor. The ozone which, in this case, is injected in a gaseous monophase form indeed enables the efficient oxidizing of the organic matter contained in the water to be treated while at the same time sterilizing this water and improving its organoleptic qualities.

Periodically, the backwashing pump 18 may be activated to carry out reverse-current washings of the membranes by means of the permeate stored in the container 26. These backwashing steps may be accompanied by a high flow rate of air introduced into the ozone-injection circuit in order to shake the membranes so as to detach and remove the suspended matter. On this basis, the compressor 19 could provide air to the ozone-injection circuit.

Another mode of backwashing that may be employed consists in using the compressed air given by the compressor 19. To implement this mode of reverse-flow washing, it is possible to extend the tips (at the base of the modules) used to fix these modules to the wall 9. These tips then define a volume in the upper part of the permeate-recovery chamber 10 where the air collects, chasing out the permeate through the hollow fibers in a reverse current. The backwashing then starts with the use of the permeate present in the chamber 10, whose volume depends on the capacity of this chamber and ends by the penetration of air into the tips. This method of backwashing enables the elimination of the external permeate container 26 as well as the backwashing pump 18. Very usefully, this penetration of air at the end of the backwashing operation enables the integrity of the membranes to be tested.

These backwashing methods are highly flexible as compared with standard membrane systems whose volume of purging corresponds to the volume of the recycling loop. Through the installation according to the invention, the backwashing operations may be carried out without being accompanied by a purging, the solid matter being concentrated and accumulated on the surface of the reactor.

The integrity of the membranes can easily be verified by stopping the filtration and injection of ozone and by introducing air, by means of the compressor 19, into the permeate-recovery chamber 10 with a static pressure that is lower than the bubble point of the membrane. During this operation, the air displaces the water present in the hollow fibers and fills it. A leak or a broken fiber is detected immediately by observing the production of bubbles on the surface or at the bottom of the reactor.

The reactor 1 furthermore has a drain 28. This bottom drain may be used to completely empty the reactor periodically and, if necessary, to cleanse the bottom by jets of water. To clean the surface, a system of scraping or of compressed air jets (not shown) may be used to convey the floating matter towards the outlet 25.

Figures 2, 3:
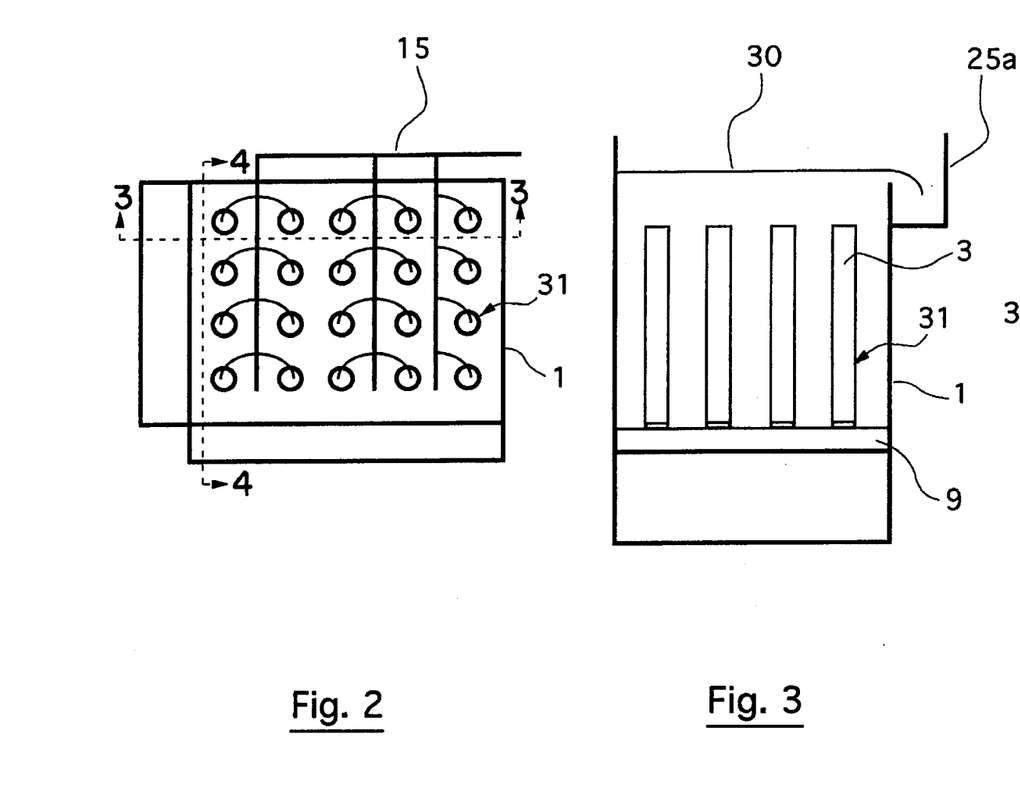
FIG. 2 shows a schematic top view of the reactor used for the installation shown in FIG. 1.
FIG. 3 shows a side view of this reactor in a sectional view along the axis 3—3 of FIG. 2.

Referring to FIG. 2, which shows the reactor 1 of the installation shown in FIG. 1, the filtration modules are supplied with ozone by a network 15 communicating with ozone production or storage means. It will be noted that since the filtration modules enclosing the membranes are relatively close to each other, the lengths of connections used to connect these filtration modules to the ozone supply network 15 are relatively short. In any case, they are far easier to implement than the connections that were hither to necessary in prior art installations for making water potable.

Referring to FIG. 3, which shows the reactor 1 in a sectional view along the axis 3—3 shown in FIG. 2, the filtration modules 31 enclosing the membranes 3 are submerged in the water to be treated up to a level 30 designed to enable the removal of floating matter by the outlet 25 constituted by a chute 25a.

Figure 4:
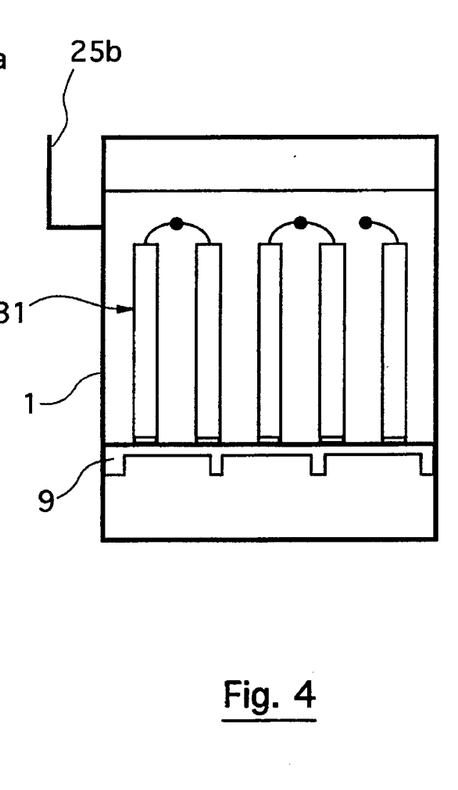
FIG. 4 shows another side view of this reactor in a sectional view along the axis 4—4 of FIG. 2.

Referring to FIG. 4 which shows a sectional view of the reactor 1 along the axis 4—4 shown in FIG. 2, a second chute 25b is designed for the supply on another side of the reactor 1.

One of the filtration modules 31 used in the installation shown schematically in FIG. 1 is shown in greater detail in FIG. 5. This filtration module 31 is formed by a sheath 5a within which there are placed membranes 3 with hollow fibers (not shown). In its lower part and in its upper part, this sheath 5a has open-worked zones 8, 8a. The means 6 for the injection of ozone into the membrane 3 including a supply tube 14 extending along the axis of the filtration module 31 enabling ozone bubbles to be conveyed to the base of the membranes so that these bubbles give a rising motion to the water penetrating through the open-worked zone 8 of the sheath 5a towards the upper open-worked zone 8a of this sheath. This carrying of the water by means of the ozone bubbles enables the water to be filtered in the membranes of hollow fibers positioned between the ozone supply tube 14 and the external sheath 5a. The permeate formed by the filtered water is recovered at the base 32 of the module. The motion followed by the water to be treated in the vicinity of the module in the reactor 1 is symbolized by the solid arrows while the motions of the ozone bubbles is shown with arrows formed by dashes.

Figure 6B:
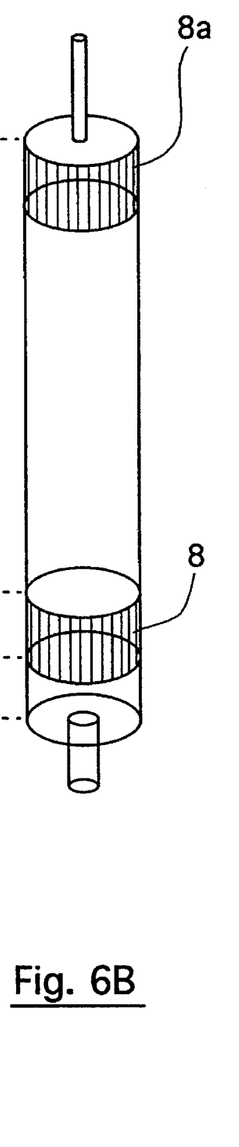

FIGS. 6 and 6b give a more precise view of the filtration modules shown in FIG. 5, and FIG. 6a shows an alternative embodiment according to which the sheath 5a surrounding the membrane 3 is provided in its lower part with an open-worked zone 8 and in its upper part with holes 8b replacing the upper open-worked zone. The ozone bubbles 11 are introduced in the same way by the injection means 6 including a supply bubble 14 conveying ozone to the base of the filtration module 31. This filtration module 31 is fixed to the wall 9 of the reactor so as to convey the permeate to the filtrate recovery chamber 10.

Figure 7:
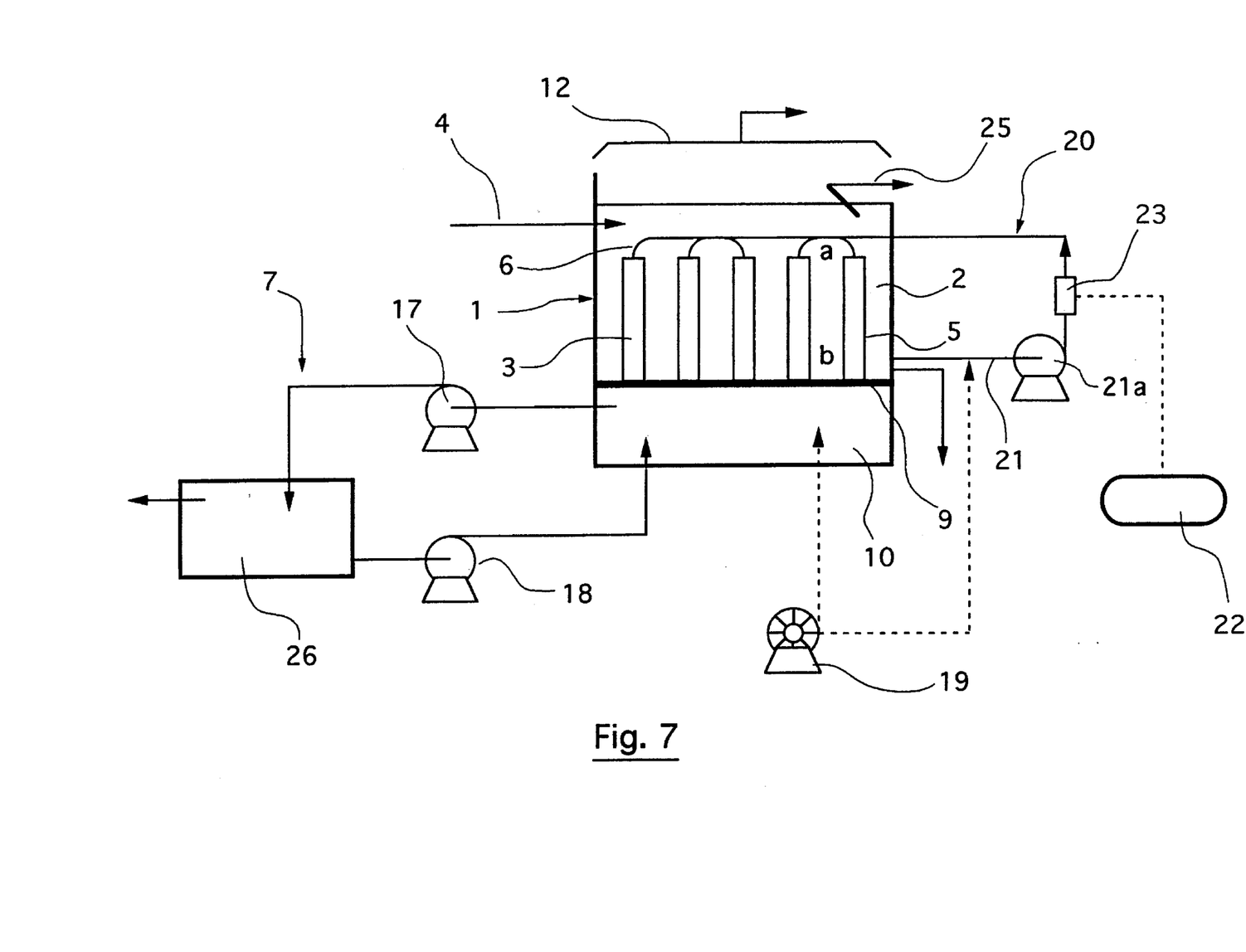
FIG. 7 shows a schematic view of another installation according to the invention working with ozone in a biphase form.

FIG. 7 shows another embodiment of an installation according to the invention, in which the ozone is injected into the membranes not in a gaseous monophase form but in a biphase form. The installation includes means 20 for the recirculation of a part of the water present in the treatment chamber 2, including a pipe 21 connected close to the bottom of the chamber 2 and communicating with the ozone distribution means 6. In this pipe 21, there are provided a recirculation pump 21a as well as a hydro-injector communicating with ozone production or storage means 22. This hydro-injector 23 enables the creation, with the water flowing in the pipe 21, of a biphase water+ozone mixture designed to be injected into the membranes 3 in order to be used as a guiding fluid for the water going through the filtration modules. The use of such a biphase mixture enables a more efficient control of the tangential flow of water in the filtration modules 31.

Figure 8:
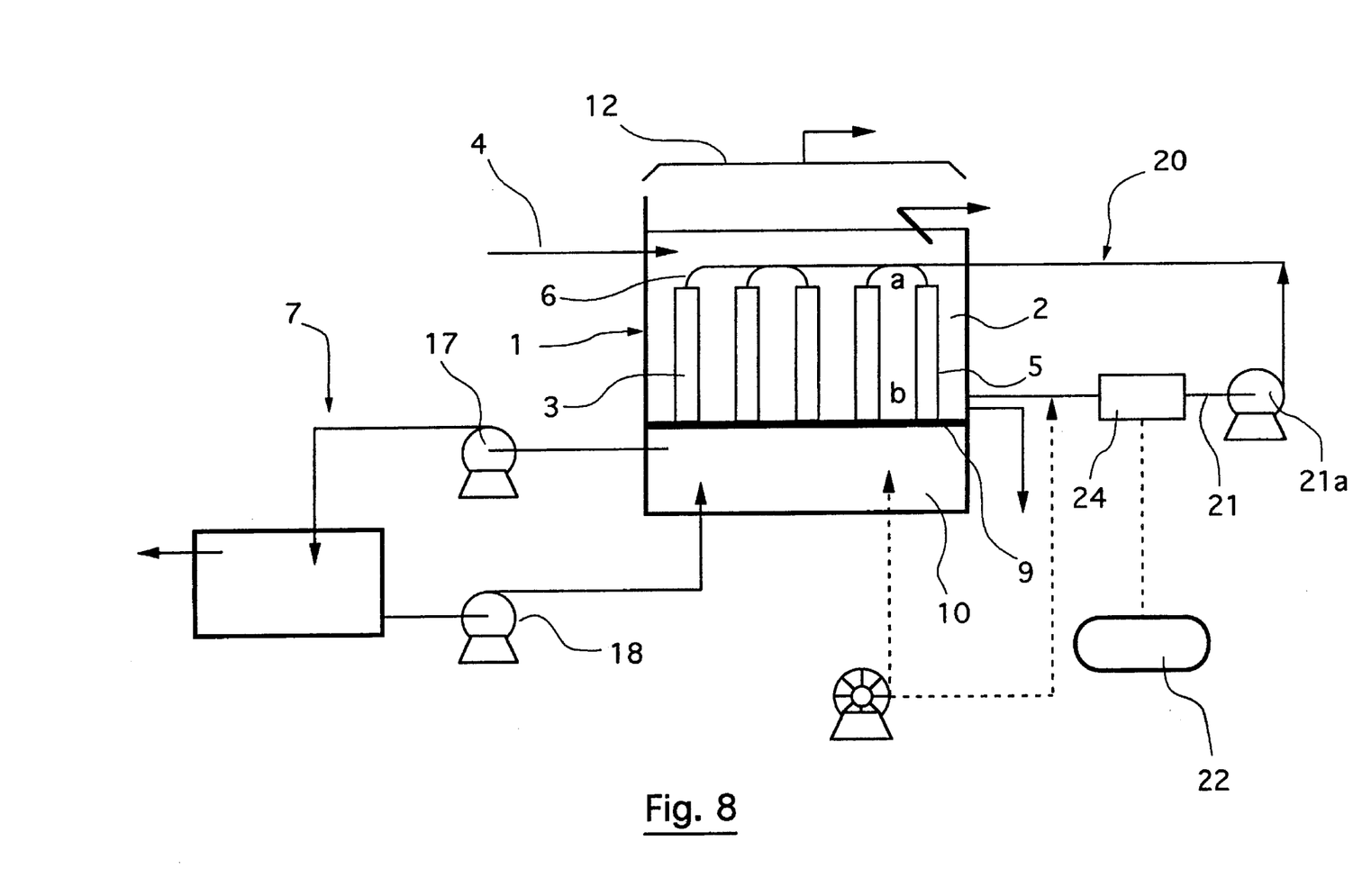
FIG. 8 shows a schematic view of yet another installation according to the invention working with ozone in an aqueous monophase form.

The installation shown in FIG. 8 includes means to produce a monophase mixture of ozone and water in order to use this mixture as a fluid for guiding the water to be filtered into the filtration modules. These means comprise recirculation means 20 including a loop 21 connecting the interior of the chamber 2 to the ozone distribution means 6. Upstream with respect to a pump 21a installed on the loop 21, an ozone saturator 24 connected to ozone production or storage means 22 enables the dissolving, under high pressure (5 to 6 bars), of the ozone in the water of the reactor conveyed by the pipe 21. The distribution tube of the filtration modules enables the de-pressurizing of the ozone-charged water perpendicularly to the membrane. Such means provide for efficient tangential flow of the water to be filtered and also enable:

the maximizing of the concentration of ozone in contact with the membrane (or, conversely, for a residual value of ozone required in the permeate, the minimizing of the ozone consumption);

the increasing of the efficiency of the flotation.

It will also be noted that the monophase water+ozone mixture formed could also be used for the backwashing operation.

Figures 9, 9A, 9C:
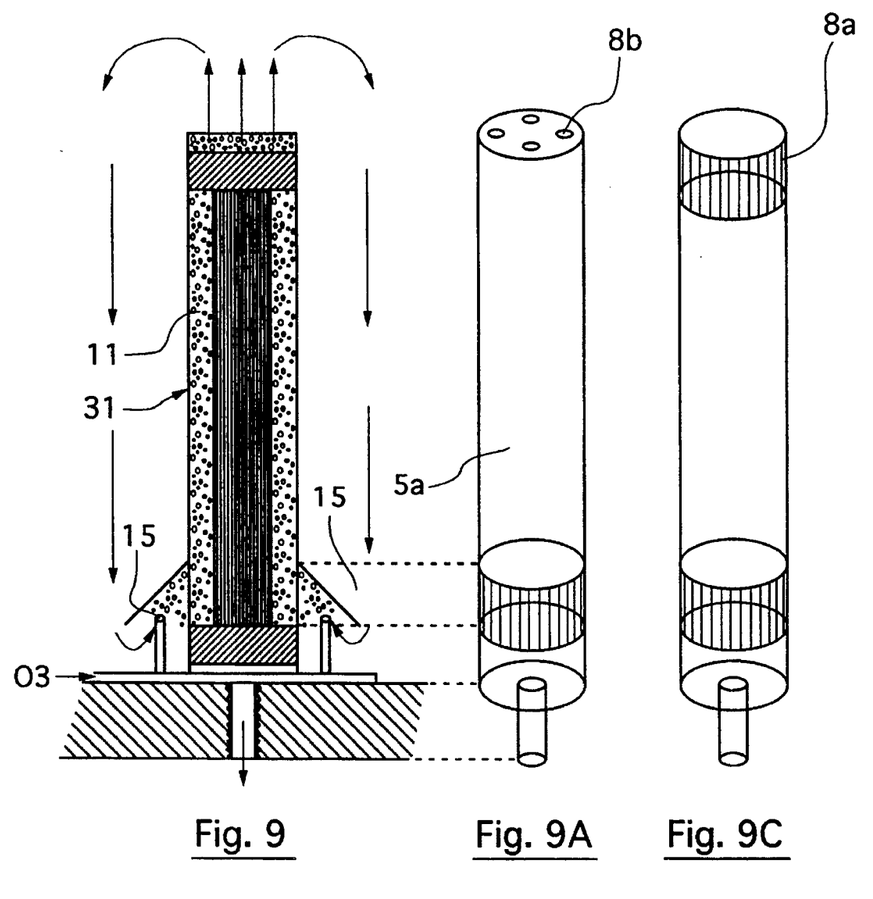
FIGS. 9, 9a, 9b, 9c show a second type of module implementing another filtration mode and its variants.
Figure 9B:
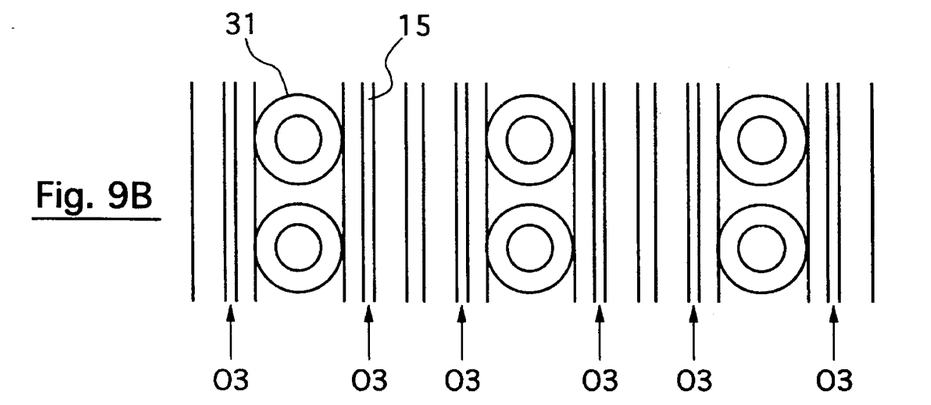

FIGS. 9 (seen in a sectional view), 9a (seen in a front view) and 9b (seen in a top view) show another mode of distribution of the ozone at the level of the filtration modules 31, wherein the distribution network 15 is set up not above the filtration modules but in the lower part of the treatment chamber and is constituted by pipes positioned essentially perpendicularly to the longitudinal axis of the modules and distributing the ozone in the form of bubbles 11 in the vicinity of these modules. The permeate, as in the embodiment shown in FIG. 1, is recovered at the base of the modules and removed towards the permeate-recovery zone 10. It will be noted that the sectional and front views show only one filtration module while the top view shows six of them.

In the alternative embodiment shown in FIG. 9c, the upper holes 8b (shown in FIG. 9a) of the filtration modules are replaced by open-worked zones 8a.

Figure 10:
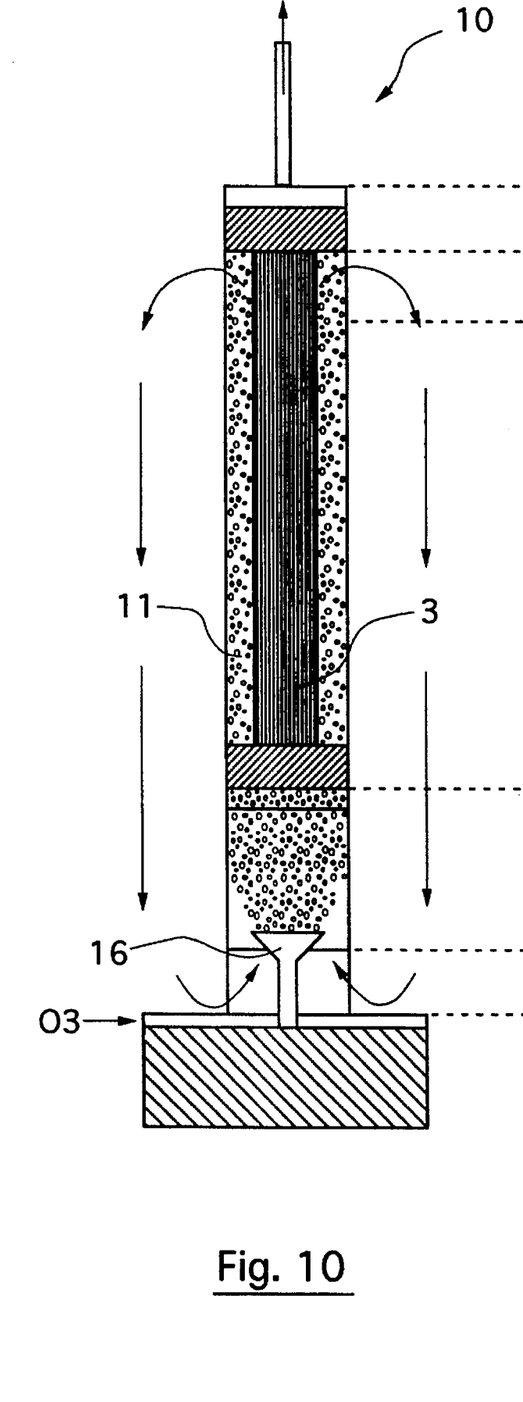
FIGS. 10 and 10A show a third type of module implementing yet another mode of filtration and a variant.
Figure 10A:
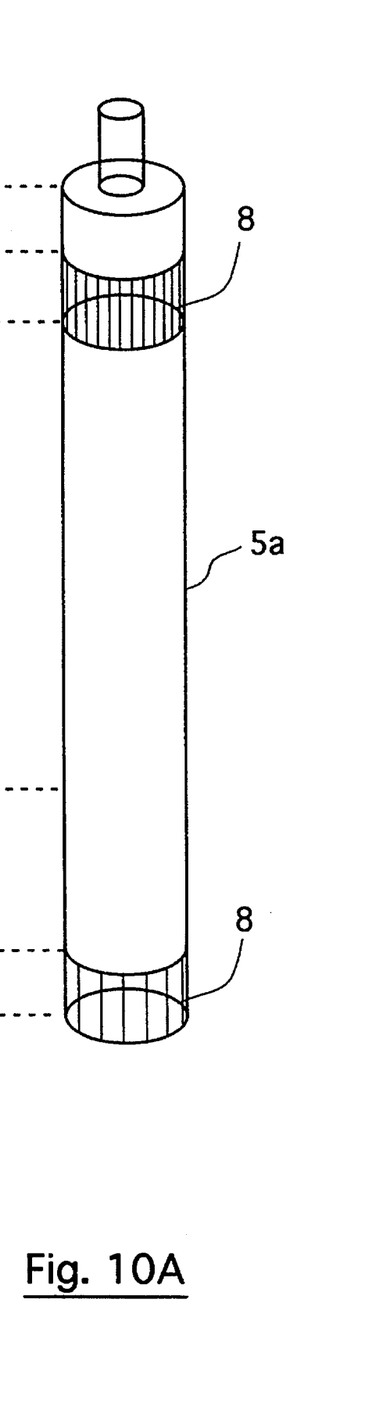

FIGS. 10 and 10A show another embodiment of the filtration modules 31 in which the ozone distribution is done by standard porous structures 16 at the base of the module, the permeate being recovered at the upper level of this module. In this case, of course, the permeate-recovery chamber 10 has to be set up above the treatment chamber 2 and not below it.

A design of this kind has the advantage of including the use of standard porous structures to setup the ozone distribution circuit and thus eliminate such a circuit on the surface of the modules and therefore considerably simplify the construction.

Figure 11:
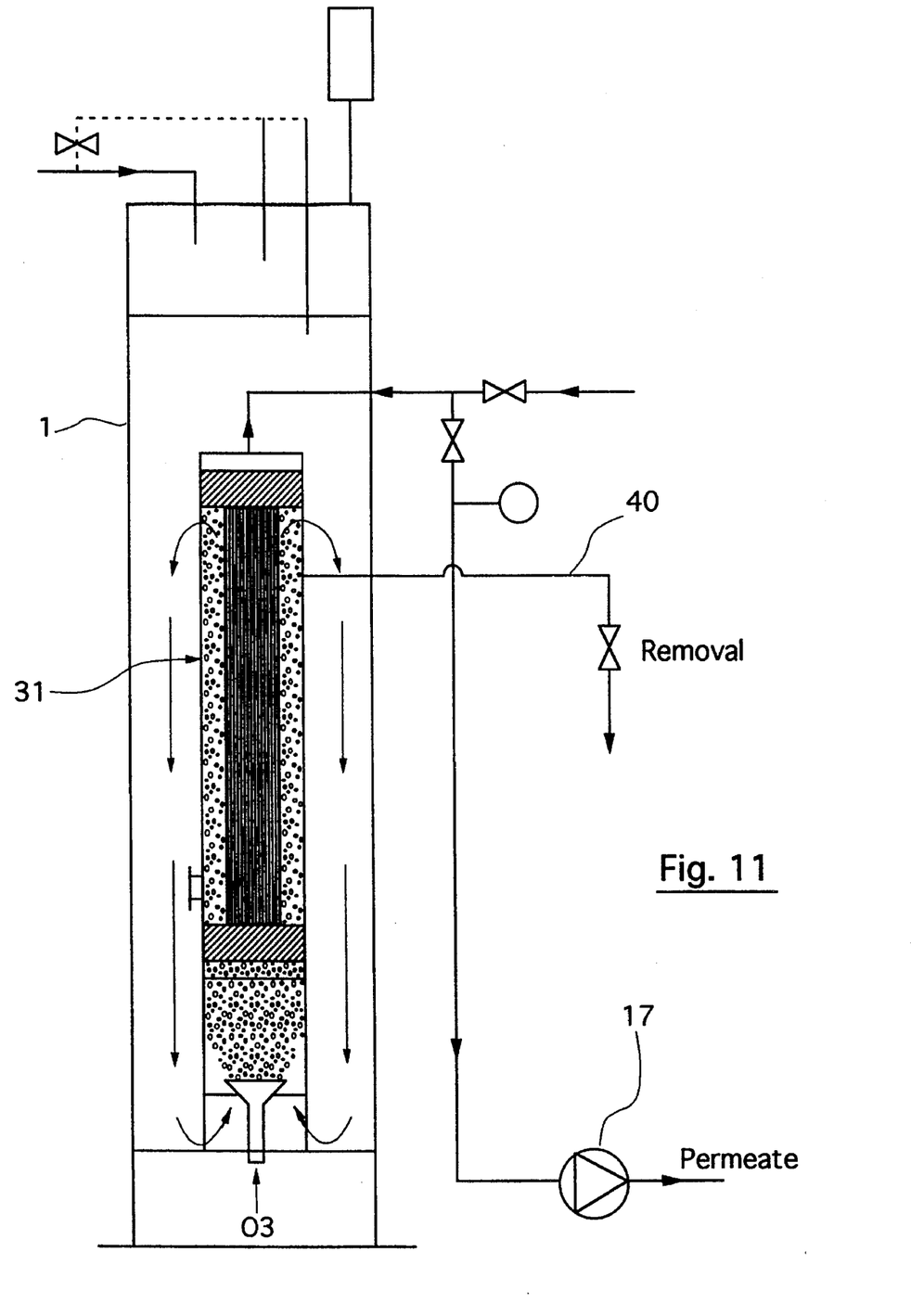
FIG. 11 shows an installation according to the invention that has been used for trials.

According to FIG. 11, an installation according to the present invention including a filtration module 31 such a the one shown in FIG. 10 was tested.

The module in question is provided with a PVDF organic membrane made of hollow fibers with a porediameter of 0.25 micrometers, the filtration being done from the exterior towards the interior of the fibers. The tested module has the following characteristics:

number of fibers per module: 800—internal diameter of the fibers: 1.1 mm—external diameter of the fibers: 2.0 mm—external filtering surface area: 5 m2—initial permeability with mains supply water: 1050 l/h.m2. b The module in question was submerged in a reactor 1 supplied with water to be treated by a pipe 4 laid out in its upper part and provided with a system of electrodes 41 enabling the level of water in the reactor 1 to be regulated.

The raw water used during the testing was Seinewater. A porous structure 16 screwed into the bottom of the reactor 1 enabled the injection of ozonized air just above the module placed vertically on a tripod. The distance between the porous structure and the module was about 70 cm. The ozonized air was injected at the base of the reactor at a treatment rate of 5 to 8 mg O3/l of water treated with a flow rate of 800 to 900 Nl/h. The mixture of liquid and gas was removed at the top of the module by 37 holes having a diameter of about 5 mm pierced into its periphery.

At the upper outlet of the module, the permeate was sucked out by means of the pump 17 at a flow rate of 1 m3/h and collected in a container (not shown). Every 10 minutes, the permeate was reinjected (by means of a pump not shown) in a counterflow through the membrane from the interior to the exterior in order to detach the particles that might have been deposited on it during filtration.

A cleansing operation was simultaneously carried out at the top part of the module to remove the water coming from the clogging, by means of a pipe 40.

The residual ozone degassing at the top part of the tower was recovered and removed by means of a thermal destructor 12.

Figure 12:
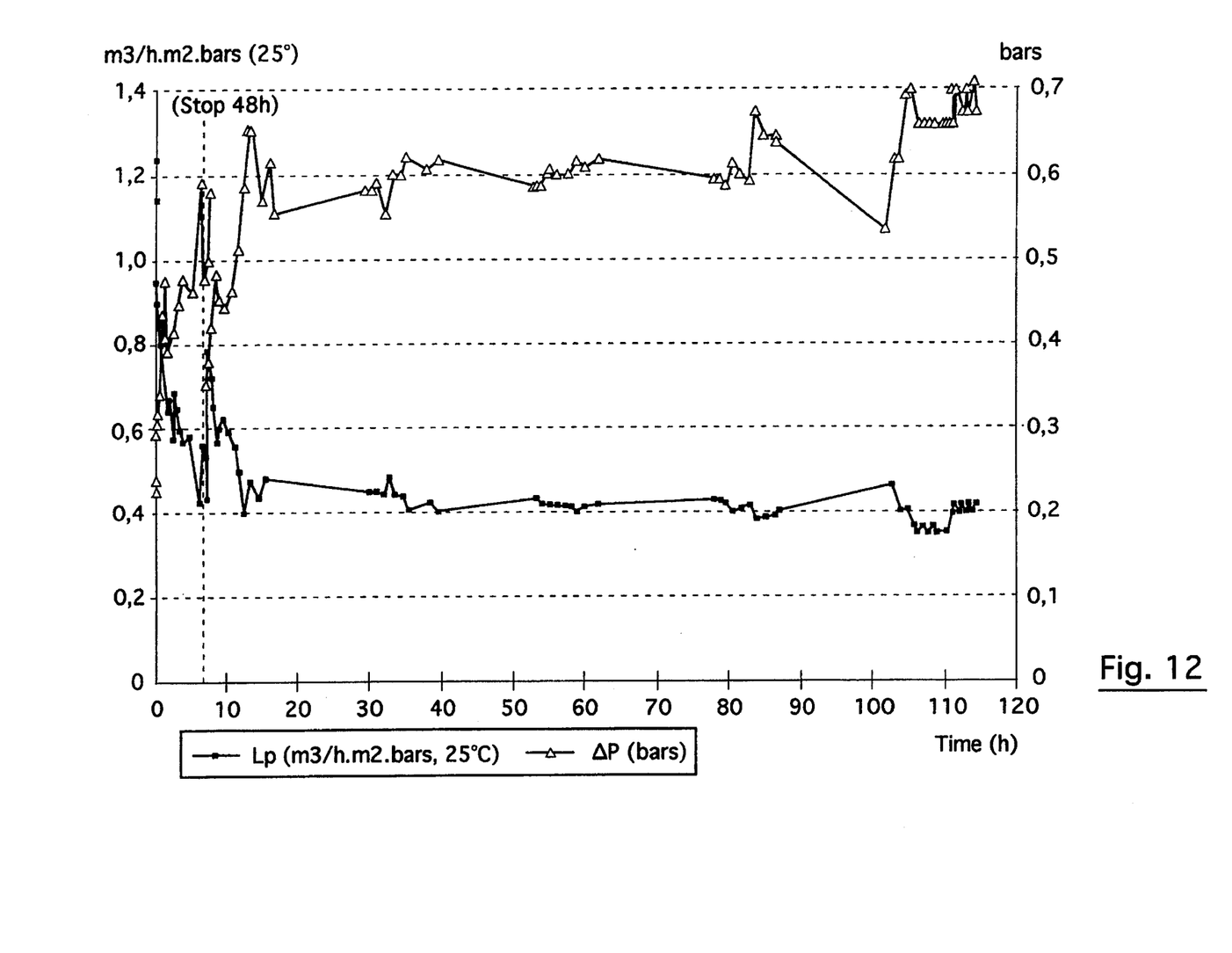
FIG. 12 shows the progress of the permeability of the membranes of the installation shown in FIG. 11 during the filtration of Seine water.

As can be seen in FIG. 12, the test carried out under these conditions enabled the maintaining of an average permeability Lp of the membranes of 400 l/h. m2. b for about 115 hours with a transmembrane pressure of 0.2 to 0.7 bars.

The residual ozone in the permeate was kept between 0.3 and 0.4 mg/l.

After the filtration of the Seine water, the membrane was regenerated with ozone. To do this, the tower was rinsed and supplied with water from the mains system. Under operating conditions identical to the foregoing ones, the water from the mains was filtered in the presence of ozonized water with a treatment rate of about 3.8 mg O3/l and a flow rate of 270 Nl/h. During a period of about 20 hours, the permeability efficiently reached a level of about 600 l/h. m2. b to 1000 l/h. m2. b.

The different embodiments of the invention described herein are not designed to reduce its scope. In particular, it will be noted that the installation according to the invention could include more than one reactor. This installation could also include units enabling an improvement in the precision of the filtration of the permeate coming out of the reactor such as filtration units on granular active carbon or filtration units on nanofiltration membrane(s) or again reverse osmosis membranes.

What is claimed is:

1. A water-treatment installation for filtering and purifying water, notably with a view to making water potable, comprising:
    a reactor demarcating at least one treatment chamber, comprising means for conveying water to be treated into said chamber, means for removing from said water floated pollutants, and means for removing decanted pollutants, said means connected to said reactor;
    a plurality of filtration membranes being disposed within said chamber and submerged in the water to be treated;
    means for demarcating a filtration zone around each of said membranes;
    carrying and circulating means for guiding a current of the water to be treated in said filtration zone along a preferred direction, said carrying and circulating means including ozone-injection means for injecting ozone into said filtration zone;
    means for recovering permeate at an outlet of said filtration membranes; and
    wherein said preferred direction is a flow of the current of water tangential to said membranes.

2. An installation according to claim 1, wherein said demarcating means which demarcate the filtration zones are constituted by sheaths each surrounding one membrane, said sheaths having a plurality of holes that enable a passage of the water to be treated in said preferred direction of treatment.

3. An installation according to claim 1, wherein said membranes and said demarcating means which demarcate the filtration zone around each of said membranes have a vertical position within said treatment chamber.

4. An installation according to claim 1, wherein said reactor is provided with a wall to which said membranes are fixedly joined, said wall forming a double chamber constituted by a treatment chamber and by a permeate-recovery chamber.

5. An installation according to claim 4, wherein said wall forms a bottom for said treatment chamber.

6. An installation according to claim 4, wherein said wall between the treatment chamber and the permeate-recovery chamber is provided with means for injecting, into said membranes, a fluid for washing the membranes.

7. An installation according to claim 6, further comprising a backwashing pump enabling said membranes to be washed in a reverse current by said permeate, the backwashing pump being communicated with a permeate storage container for storing the permeate outside of the permeate-recovery chamber and said permeate-recovery chamber.

8. An installation according to claim 6, further comprising means for injecting, ,in reverse current, an aqueous monophase mixture of water and ozone in backwashing operations.

9. An installation according to claim 4, further comprising an air compressor, the air compressor enabling injection of pressurized air into said permeate-recovery chamber.

10. An installation according to claim 9, further comprising means for injecting compressed air into the permeate-recovery chamber.

11. An installation according to claim 4, wherein said treatment chamber is located at an upper location in said reactor, and the permeate-recovery chamber is placed at a lower location in said reactor.

12. An installation according to claim 1, wherein said ozone-injection means are constituted by means for forming ozone bubbles and include means for dissolving ozone in water.

13. An installation according to claim 1, further comprising means for recovering a residual ozone.

14. An installation according to claim 1, wherein each of said membranes are constituted by a set of hollow fibers used in external/internal filtration mode.

15. An installation according to claim 14, wherein said hollow fibers are plugged at one of their ends, the other end communicating with said recovering means for recovering the permeate.

16. An installation according to claim 14, wherein said ozone-injection means include at least one supply tube going through said membranes along a longitudinal axis of each of the membranes, in parallel to said hollow fibers, said at least one supply tube enabling the ozone to be conveyed from a supply network provided above said membranes down to a base of said membranes.

17. An installation according to claim 14, wherein said ozone-injection means comprise porous structures.

18. An installation according to claim 7, wherein said porous structures are set up at a base of said membranes.

19. An installation according to claim 14, wherein said sheaths demarcating the filtration zones have lower holes into which the water penetrates and upper holes by which the water and carrying fluid escape, the water having a rising motion tangential to said membranes.

20. An installation according to claim 17, wherein said means for recovering the permeate comprise at least one suction pump.

21. An installation according to claim 1, further comprising means recirculating the water present in said treatment chamber.

22. An installation according to claim 21, wherein said recirculating means include at least one recirculation loop on which ozone-supply means are set up.

23. An installation according to claim 22, further comprising at least one hydro-injector provided on said at least one recirculation loop, said at least one hydro-injector enabling dispersal of the ozone given by the ozone-supply means in the water flowing through said recirculation loop.

24. An installation according to claim 22, further comprising at least one saturator provided on said recirculation loop, said saturator enabling dissolving, under high pressure, of the ozone given by the ozone-supply means in the water flowing through said recirculation loop.

25. An installation according to claim 1, further comprising refining units for refining water treated, said units being set up at an outlet of said reactor.

26. An installation according to claim 25, wherein said refining units are selected from a group consisting of a nanofiltration membrane or reverse osmosis membranes.

27. A filtration set for treatment of water, notably with a view to making potable, wherein said set comprises:

a treatment chamber comprising means for conveying the water to be treated into said treatment chamber, means for removing floated pollutants and means for removing decanted pollutants;

a filtration membrane surrounded by a sheath demarcating a filtration zone, said membrane being disposed within said treatment chamber;

a wall to which said membrane is fixed, defining a bottom in said treatment chamber and demarcating a zone for recovering permeate; and ozone-injection means for creating a current of water within said sheath.

28. A method for treating water, notably with a view to making the water potable, said method comprising the steps of:

filtering the water through a plurality of membranes submerged in the water to be treated in a reactor;

preparing a filtration zone around each of the membranes;

carrying along a current of water in the filtration zone in a preferred direction by the use of carrying and circulating means that include ozone-injection means; and recovering permeate at an outlet from said membranes.

29. A method according to claim 28, further comprising a step of eliminating at least a part of pollutant matter dissolved in the water to be treated by adding to said treatment chamber at least one reagent that is a coagulant, adsorbent or oxidant.

30. A method according to claim 28, further comprising a step of injecting compressed air into a permeate-recovery chamber of said reactor to check integrity of the membranes.

31. A method according to claim 28, further comprising a step of regenerating said membranes by washing with ozone.

32. An installation according to claim 31, wherein the regenerating step including a step of washing with a cleansing solution containing at least one chemical, said treatment chamber of the installation being a vessel for mixing and recycling of said cleansing solution.

33. A water-treatment installation, notably with a view to making water potable, comprising:

a reactor demarcating a chamber into a permeate-recovery chamber and a treatment chamber, the reactor comprising means for conveying water to be treated into said chamber, means for removing floated pollutants, and means for removing decanted pollutants;

a plurality of filtration membranes being disposed within said chamber and submerged in the water to be treated;

means for demarcating a filtration zone around each of said membranes;

carrying and circulating means for guiding a current of the water to be treated in said filtration zone along a preferred direction, said carrying and circulating means including ozone-injection means for injecting ozone into said filtration zone;

means for recovering permeate at an outlet of said filtration membranes; and a wall, disposed between the treatment chamber and the permeate-recovery chamber, being provided with means for injecting, into said membranes, a fluid for washing the membranes.

34. An installation according to claim 33, further comprising means for injecting, in reverse current, an aqueous monophase mixture of water and ozone in backwashing operations.

* * * * *

UNITED STATES PATENT AND TRADEMARK OFFICE
CERTIFICATE OF CORRECTION

PATENT NO. : 5,607,593

DATED : Mar. 4, 1997

INVENTOR(S) : Cote et al.

It is certified that error appears in the above-identified patent and that said Letters Patent is hereby corrected as shown below:

In column 4, line 58, delete "-" after "areas".

In column 14, line 12, claim 8, delete ", ," after "injecting"; line 32, claim 14, "are" should read --is--; line 54, claim 20, insert --recovering-- after "said".

In column 15, line 27, claim 28, insert --in a reactor-- after "water"; line 35, claim 28, delete "the use of" after "by".

Signed and Sealed this

Twenty-first Day of October 1997

*Attest:*

BRUCE LEHMAN

*Attesting Officer*  *Commissioner of Patents and Trademarks*